US011992939B2

United States Patent
Yang et al.

(10) Patent No.: US 11,992,939 B2
(45) Date of Patent: May 28, 2024

(54) ROBOT PALM

(71) Applicant: KOREA INSTITUTE OF SCIENCE AND TECHNOLOGY, Seoul (KR)

(72) Inventors: Sungwook Yang, Seoul (KR); Jeongwon Lee, Seoul (KR); Jaehee Kim, Seoul (KR); Donghyun Hwang, Seoul (KR); Yong Seok Ihn, Seoul (KR)

(73) Assignee: Korea Institute of Science and Technology, Seoul (KR)

(*) Notice: Subject to any disclaimer, the term of this patent is extended or adjusted under 35 U.S.C. 154(b) by 293 days.

(21) Appl. No.: 17/389,086

(22) Filed: Jul. 29, 2021

(65) Prior Publication Data

US 2022/0168908 A1 Jun. 2, 2022

(30) Foreign Application Priority Data

Nov. 30, 2020 (KR) ........................ 10-2020-0163751

(51) Int. Cl.
*B25J 15/10* (2006.01)
*B25J 15/00* (2006.01)

(52) U.S. Cl.
CPC ........... *B25J 15/10* (2013.01); *B25J 15/0023* (2013.01); *B25J 15/0009* (2013.01)

(58) Field of Classification Search
CPC ..... B25J 15/0009; B25J 15/0023; B25J 15/10
USPC ................................................. 294/86.4, 106
See application file for complete search history.

(56) References Cited

U.S. PATENT DOCUMENTS

| | | | |
|---|---|---|---|
| 7,370,896 B2 | 5/2008 | Anderson et al. | |
| 8,100,451 B2* | 1/2012 | Okuda ................. | B25J 15/0009 294/213 |
| 8,882,165 B2 | 11/2014 | Lipson et al. | |
| 10,357,883 B1* | 7/2019 | O'Connor ............ | B25J 15/0616 |
| 10,946,534 B2* | 3/2021 | Nagata ................. | B25J 15/0038 |
| 2008/0019803 A1 | 1/2008 | Dai | |
| 2019/0308331 A1 | 10/2019 | Hurwit et al. | |
| 2020/0206948 A1 | 7/2020 | Olivier et al. | |
| 2020/0215701 A1* | 7/2020 | Takahashi ............... | B29C 39/24 |

(Continued)

FOREIGN PATENT DOCUMENTS

DE 102016115102 A1 * 2/2018 ............ B25J 13/081
JP H09-150384 A 6/1997

(Continued)

OTHER PUBLICATIONS

Andrew A. Stanley et al., "Closed-Loop Shape Control of a Haptic Jamming Deformable Surface," 2016 IEEE International Conference on Robotics and Automation, Stockholm, Sweden, pp. 2718-2724, May 16-21, 2016.

(Continued)

*Primary Examiner* — Dean J Kramer
(74) *Attorney, Agent, or Firm* — Rabin & Berdo, P.C.

(57) ABSTRACT

The present disclosure provides a robot palm, which includes: a housing having a particle-containing space configured to accommodate particles so that a pressure thereof is changeable; particles filled in the particle-containing space; and an upper membrane installed at an upper portion of the housing and configured to grip an object by changing its shape and rigidity according to a pressure change of the particle-containing space.

5 Claims, 13 Drawing Sheets

(56) References Cited

U.S. PATENT DOCUMENTS

2020/0215702 A1* 7/2020 Takahashi ............... B25J 15/12
2020/0238541 A1* 7/2020 Hatano ................. B25J 9/0009

FOREIGN PATENT DOCUMENTS

JP       2018-149636 A    9/2018
KR     10-2032052 B1    10/2019

OTHER PUBLICATIONS

Eric Brown et al., "Universal robotic gripper based on the jamming of granular material," PNAS, 2010, vol. 107, No. 44, pp. 18809-18814, Nov. 2, 2010.

* cited by examiner

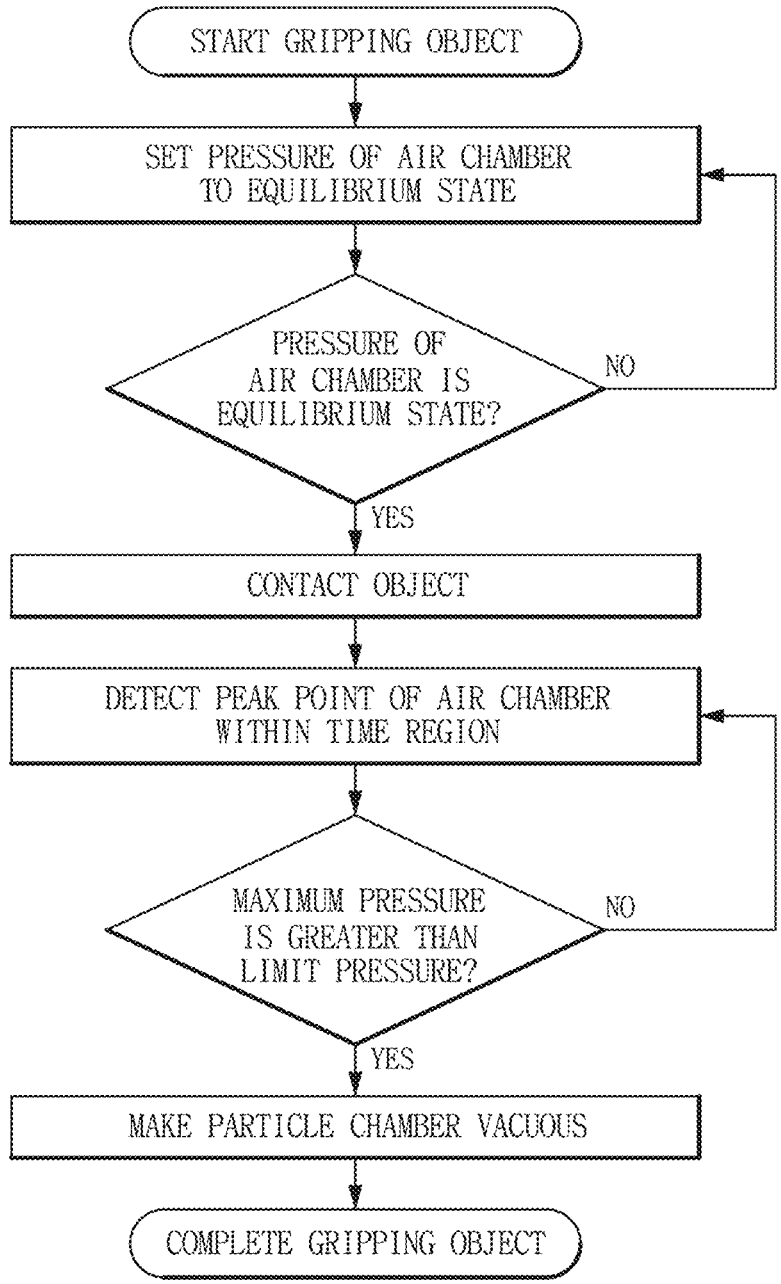

ROBOT PALM

CROSS-REFERENCE TO RELATED APPLICATIONS

This application claims priority to Korean Patent Application No. 10-2020-0163751 filed on Nov. 30, 2020, and all the benefits accruing therefrom under 35 U.S.C. § 119, the contents of which in its entirety are herein incorporated by reference.

BACKGROUND

1. Field

This disclosure relates to a robot palm, and more particularly, to a robot palm having improved adaptability to an object shape.

2. Description of the Related Art

In recent decades, various robotic hands have been introduced to grasp or manipulate objects. Various types of robotic hands are known in the art and may be classified into three groups as follows. First, there is known a multi-purpose gripper that grips a hard object and generally performs a specific task. This robotic hand shows excellent performance in grasping a well-defined object with high payload capability.

Also, there is known an anthropomorphic robotic hand that resembles a human hand. Despite high dexterity, its load capacity is relatively limited. Recently, a soft robotic hand has been introduced. The soft robotic hand may suitably adapt to an object of any shape because it involves soft and flexible materials along with soft mechanisms. In addition, the flexible mechanism greatly reduces the number of kinematic joints of an existing robotic hand, thereby reducing the burden of controlling multiple joints. However, although the soft robotic hand is better at adapting to various objects than the existing robotic hands, there are still difficulties in holding a heavy object and maintaining a firm grip during manipulation.

Meanwhile, although the robotic hand itself has been the focus of robotic research for decades, research on the robotic palm has received relatively little attention. However, the human palm plays an important role in gripping objects with various geometries. For example, the human palm changes its shape with a deformable skin according to various shapes of objects, thereby providing a stable grip and support. Although the degree of freedom (DOF) of the palm is only 6 degrees of freedom (DOF) among a total of 24 degrees of freedom of the entire hand, a person may adjust the shape and contact area of the palm according to tasks and objects, such as holding a tray or climbing.

Conventionally, a technique for designing a robot palm to have anatomical consistency with a human hand including the palm is known in the art. Also, there is known a soft robotic palm that mimics the characteristics of a human palm.

However, the robot palm may be changed in shape by using an electrically coupled fluid, but in order to operate the electrically coupled fluid, a high DC voltage is used. Therefore, it is required to develop a technology that may realize the palm itself well.

SUMMARY

This disclosure is designed to solve the above problems, and the present disclosure is directed to providing a robot palm, which has at least one chamber structure to improve adaptability to an object shape, i.e. a volume change.

In one aspect of the present disclosure, there is provided a robot palm, comprising: a housing having a particle-containing space configured to accommodate particles and in which a pressure is changeable; particles filled in the particle-containing space; and an upper membrane installed at an upper portion of the housing and configured to grip an object by changing its shape and rigidity according to a pressure change of the particle-containing space.

According to an embodiment of the present disclosure, the housing may include: a base structure having a bottom surface and a sidewall extending upward from the bottom surface; and a rim installed at an upper surface of the upper membrane to fix the upper membrane to the base structure.

Preferably, the rim may be disposed at an edge of the upper membrane.

According to another embodiment of the present disclosure, a hand member is installed at a lower portion of the housing, which is configured to allow the object to be supported by the upper membrane, and the hand member may include: a palm support disposed at the lower portion of the housing to support the housing; and a finger structure connected to the palm support to be bendable and configured to grip the object.

In addition, a plurality of the finger structures are provided, and each of the finger structures may include: a plurality of joint portions connected to each other to be bendable relative to each other; and a connection pin configured to connect neighboring joint portions to each other among the plurality of joint portions.

According to still another embodiment of the present disclosure, the housing may further include an air-receiving space configured to accommodate air, and the robot palm may further comprise a middle membrane installed at the housing and provided between the particle-containing space and the air-receiving space.

According to still another embodiment of the present disclosure, the housing may include: a base structure having a bottom surface and a sidewall extending upward from the bottom surface and having the air-receiving space provided at an inside thereof surrounded by the bottom surface and the sidewall; a middle structure configured to form a side surface between the middle membrane and the upper membrane and having the particle-containing space between the middle membrane and the upper membrane; and a rim installed at an upper portion of the upper membrane to fix the upper membrane to the middle structure.

The air-receiving space may be provided to a lower side of the particle-containing space with the middle membrane being interposed therebetween.

An air supply tube may be installed at the base structure, which is configured to communicate with the air-receiving space to supply air to the air-receiving space, and a vacuum tube may be connected to the middle structure, which is configured to communicate with the particle-containing space to make the particle-containing space vacuous.

The robot palm of the present disclosure makes it possible to improve the adaptability to an object shape, i.e. a volume change, by a double chamber structure having an air-receiving space in addition to the particle-containing space.

The robot palm of the present disclosure is not limited in thickness and may be deformed while adapting to the shape of the object, and it enables to lift the object by itself by changing the shape.

BRIEF DESCRIPTION OF THE DRAWINGS

FIG. 8 is a flowchart for illustrating an example whether an object is gripped by the robot palm according to the second embodiment of the present disclosure.

DETAILED DESCRIPTION

Figure 1A:
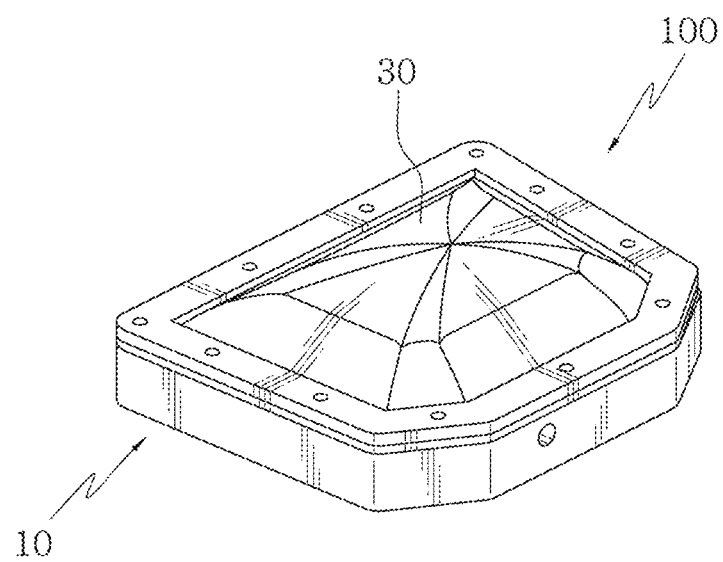
FIG. 1A is a perspective view showing a robot palm according to the first embodiment of the present disclosure.

Hereinafter, the embodiments disclosed in this specification will be described in detail. Here, identical or similar components are denoted by identical or similar reference symbols and not described in detail again. In the following description, the word "portion" used in terms is selected or endowed only in consideration of ease naming and does not have any distinguishable meaning or role. In addition, in the following description of the embodiments of the present disclosure, any detailed description of related arts can be omitted if it is determined that the gist of the embodiments disclosed herein can be obscured by the same. Moreover, it should be understood that the accompanying drawings are just for better understanding of the embodiments disclosed herein and are not to be construed as limiting the scope of the present disclosure. The scope of the present disclosure should be understood as including all changes, equivalents and alternatives thereof.

Terms having an ordinal such as "first" and "second" can be used for explaining various components, but the components are not limited by the terms. These terms are just used for distinguishing any component from another.

In case it is mentioned that any component is "connected" to another component, the component may be connected directly to another component, but it should be understood that any other component can be further interposed between them.

The singular expressions are intended to include the plural forms as well, unless the context clearly indicates otherwise.

In this specification, the term such as "include" and "have" is just to specify the presence of features, integers, steps, operations, elements, parts or components thereof, stated in the specification, but does not preclude the presence or addition of one or more other features, integers, steps, operations, elements, parts or components thereof.

Referring to FIGS. 1A, 1B, 5A and 5B, a robot palm 100, 200 of the present disclosure includes a housing 10, 210, particles 20 and an upper membrane 30, 230.

The housing 10, 210 includes a particle-containing space 11, 211 for accommodating the particles 20 therein.

The housing 10, 210 may have different shapes according to the robot palm 100, 200 of the first and second embodiments, explained later, and this will be described later in relation to the first and second embodiments.

The particles 20 are filled in the particle-containing space 11, 211.

Also, the particles 20 may have three sizes: small diameter, medium size, and large size. The diameter of the small size is 0.5 to 0.7 mm, the diameter of the medium size is 0.7 to 1.0 mm, and the diameter of the large size is 1.0 to 2.0 mm.

In the present disclosure, the particles 20 may be a granular material.

The robot palm 100, 200 of the present disclosure may be understood to be implemented by a granular jamming mechanism.

The upper membrane 30, 230 is installed at an upper portion of the housing 10, 210. The upper membrane 30, 230 is a component in contact with an object, and may be understood as a robot palm.

The upper membrane 30, 230 may be manufactured by 3D molding, for example, a silicon material.

Preferably, the upper membrane 30, 230 may be flexible enough to be completely deformable while accommodating various object shapes.

The present disclosure may include the robot palm 100 of the first embodiment that forms a single chamber structure by having only the particle-containing space 11, and the robot palm 200 of the second embodiment that forms a double chamber structure by having the particle-containing space 211 and an air-receiving space 213a.

Hereinafter, the robot palm 100 according to the first embodiment forming a single chamber structure of the present disclosure will be described with reference to FIGS. 1A to 2, 6A and 6B.

Figure 1B:
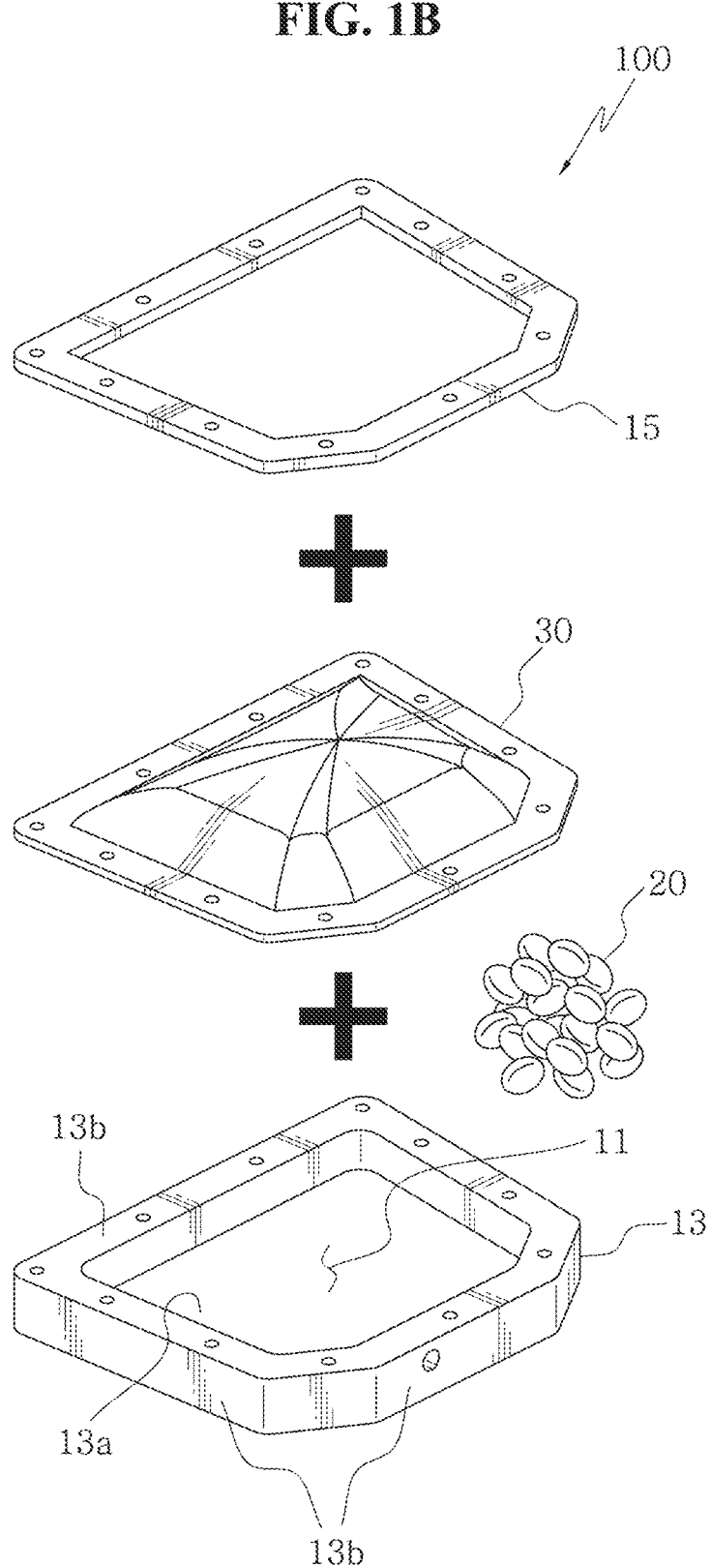
FIG. 1B is an exploded perspective view of FIG. 1A.

As shown in FIG. 1B, the robot palm 100 of the first embodiment is configured such that the housing 10 includes a base structure 13 and a rim 15.

The base structure 13 includes a bottom surface 13a and a sidewall 13b extending upward from the bottom surface 13a.

The base structure 13 may be manufactured by, for example, laser-cutting an acrylic plate.

The rim 15 is installed at an upper surface of the upper membrane 30 in order to fix the upper membrane 30 to the base structure 13.

The rim 15 may be manufactured by, for example, laser-cutting an acrylic plate.

A hand member 1040 may be further installed at the robot palm 100 of the first embodiment. The hand member 1040 may include a palm support 1042 installed at a lower portion of the robot palm 100 to support the robot palm 100, and a finger structure 1046 installed at the palm support 1042 to hold an object.

The palm support 1042 may have a hexahedral block shape.

Figure 2:
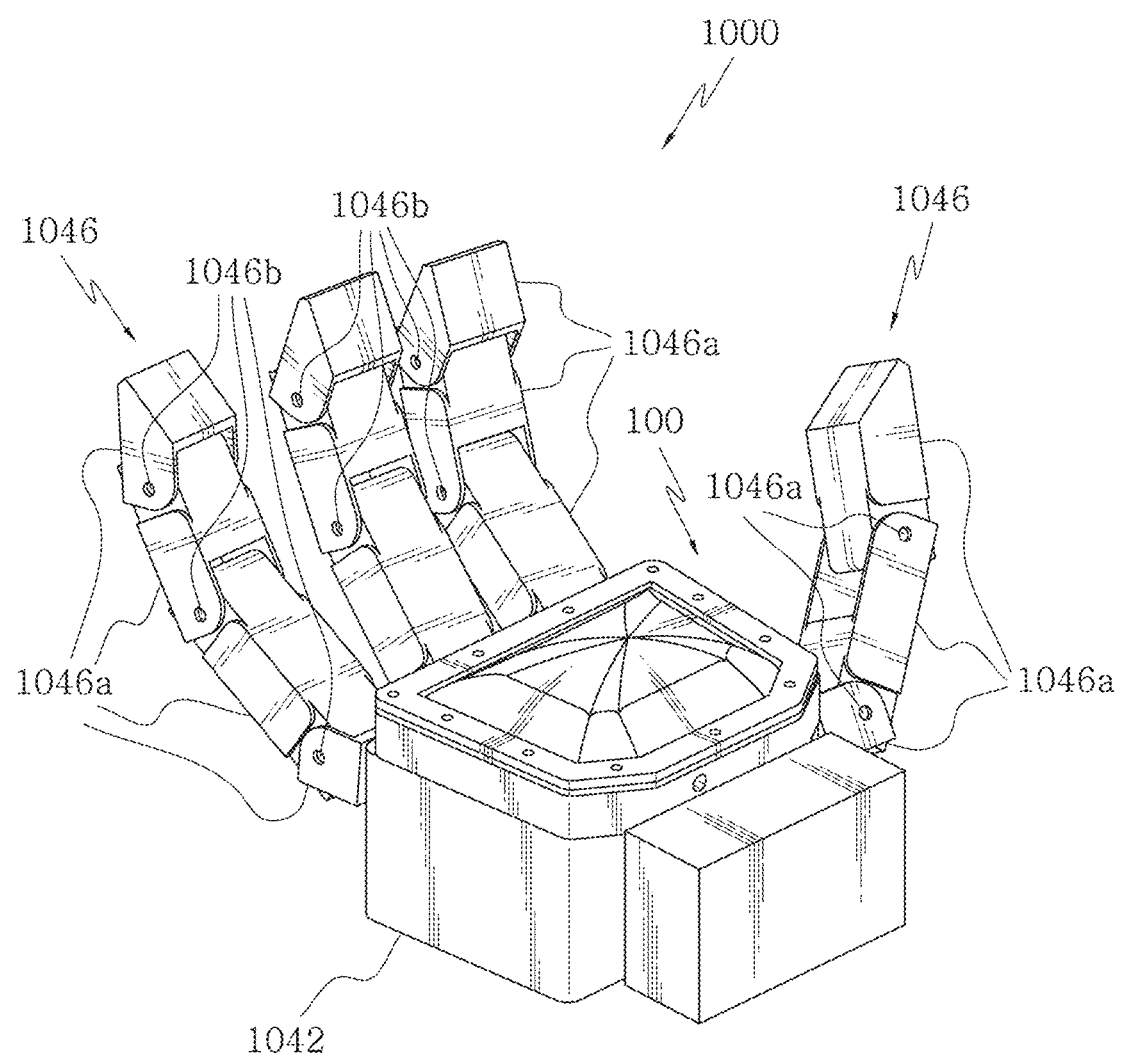
FIG. 2 is a perspective view showing a robotic hand equipped with hand members and a robot palm according to the first embodiment of the present disclosure.
Figure 3A:
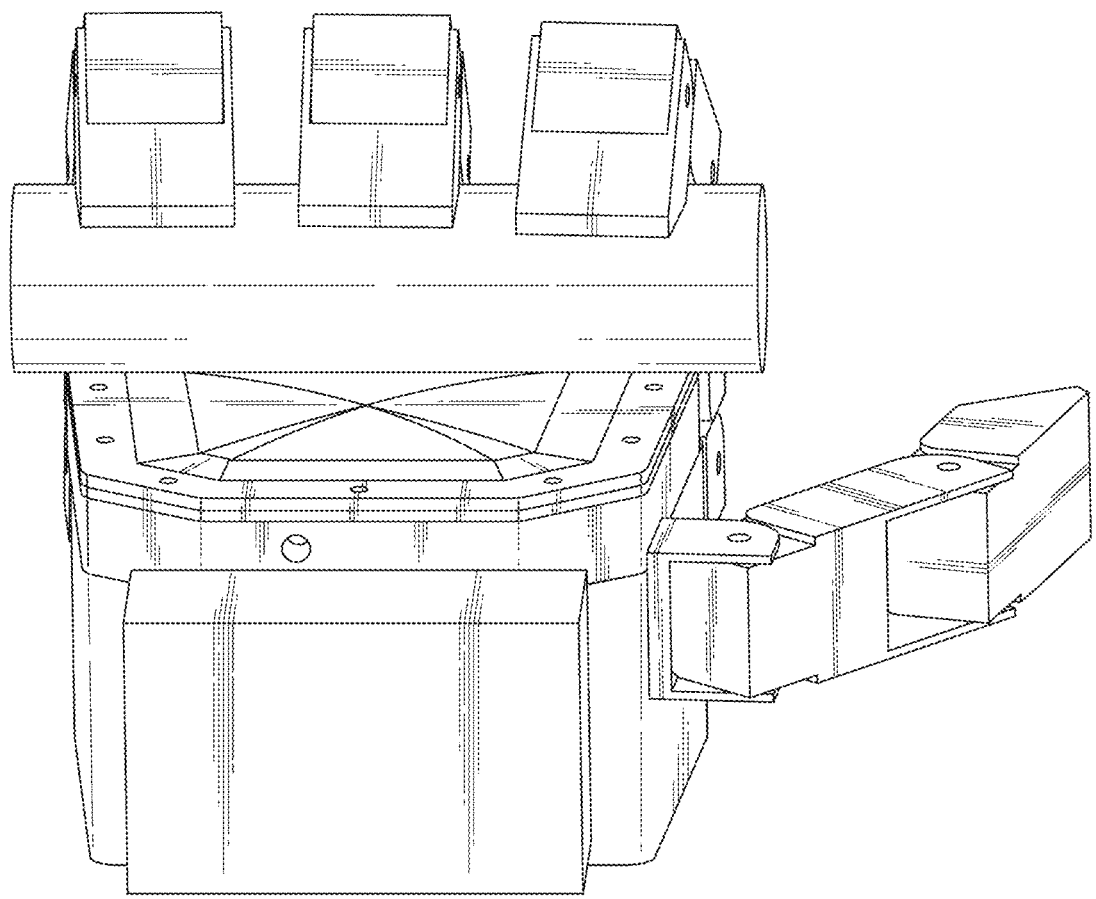
FIG. 3A shows an example where an object is placed on the robot palm of the hand member of FIG. 2 and an upper membrane is maintained parallel.
Figure 3B:
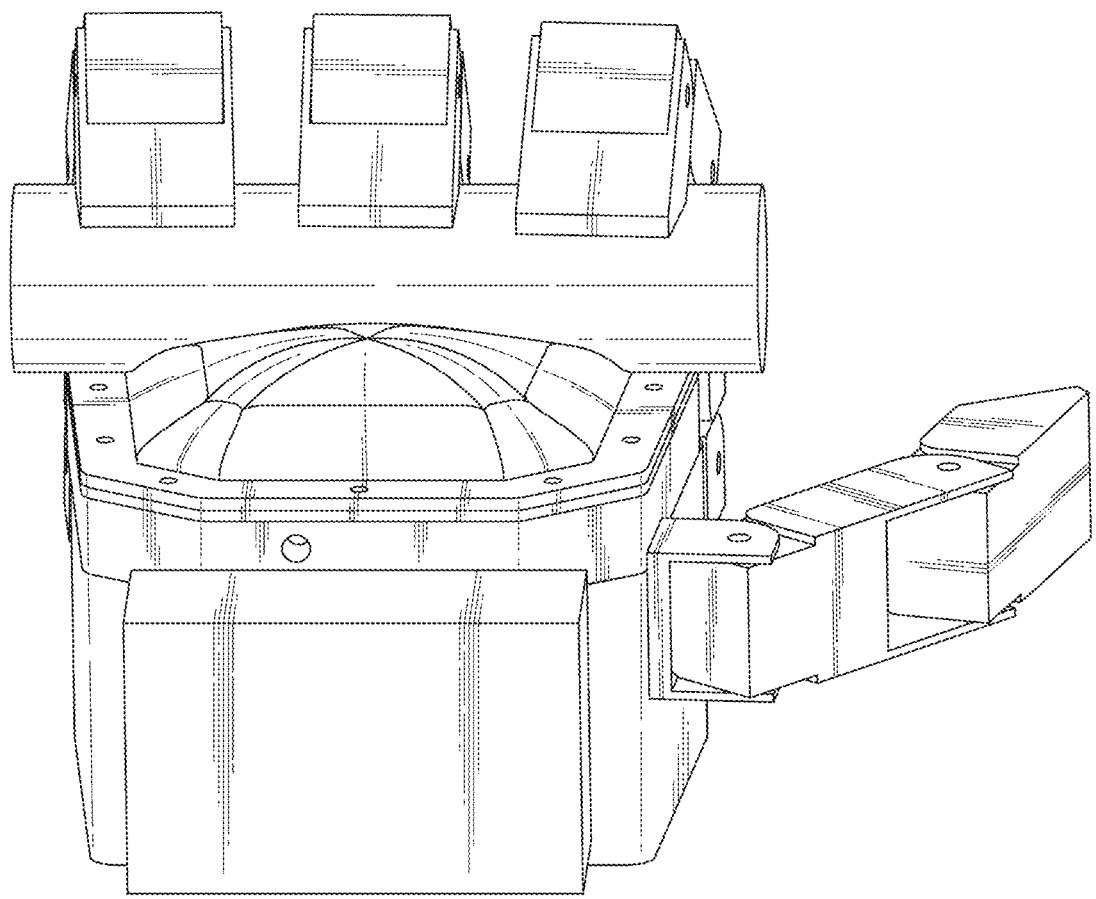
FIG. 3B shows an example where an object is placed on the robot palm of the hand member of FIG. 2 and the upper membrane inflates upward (unjammed).
Figure 3C:
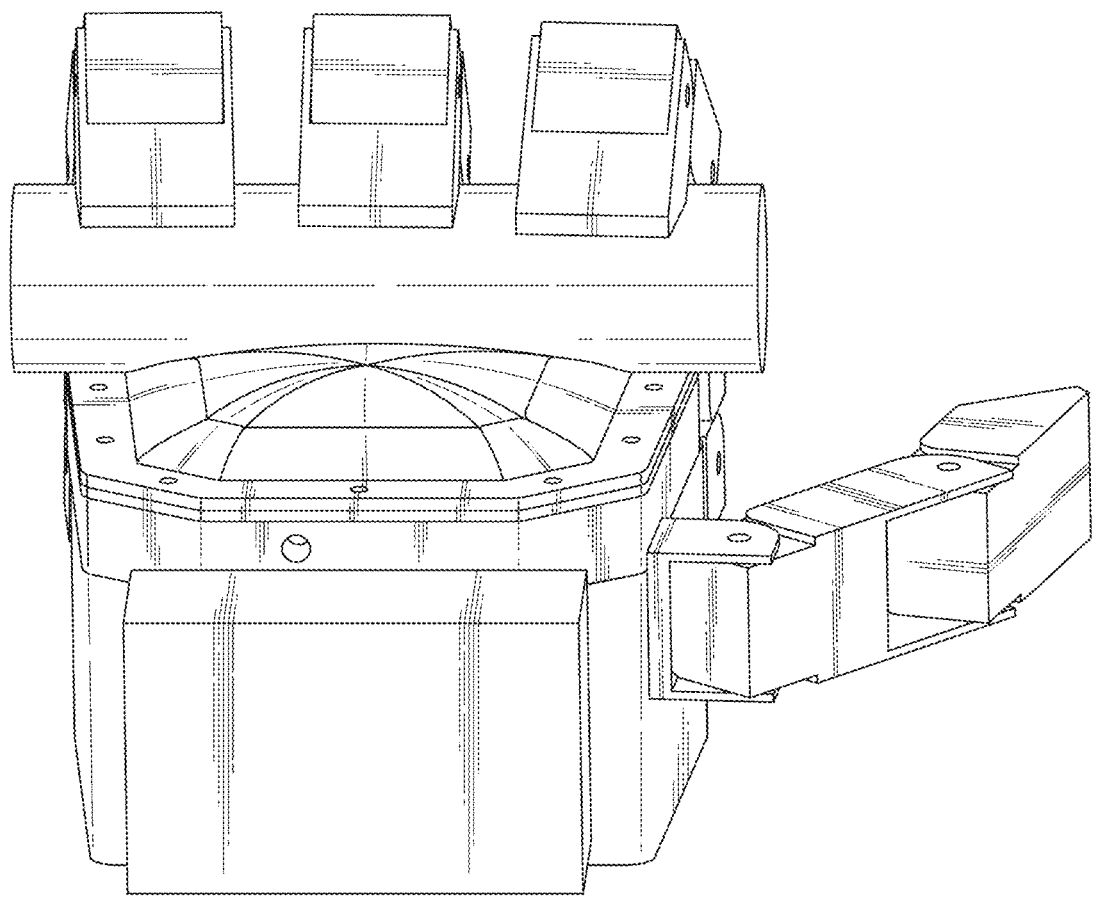
FIG. 3C shows an example where an object is placed on the robot palm of the hand member of FIG. 2 and the upper membrane is pressurized and deformed (jammed) by the object by providing a negative pressure of −7 kPa to a particle-containing space.
Figure 3D:
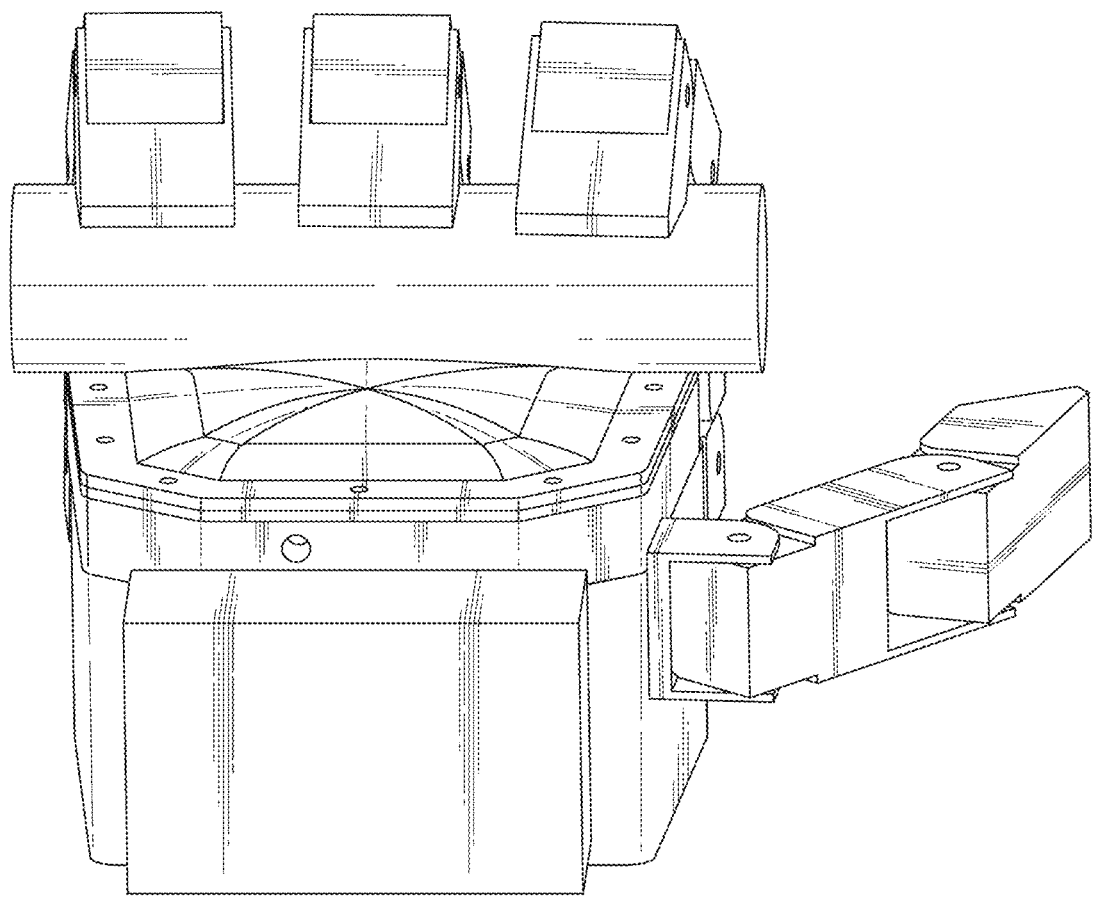
FIG. 3D shows an example where an object is placed on the robot palm of the hand member of FIG. 2 and the upper membrane is pressurized and deformed (jammed) by the object by providing a negative pressure of −38 kPa to a particle-containing space.

As shown in FIG. 2, finger structures 1046 may be provided in four.

Each of the finger structures 1046 may include a plurality of joint portions 1046a and a connection pin 1046b for connecting the plurality of joint portions 1046a.

FIG. 2 shows an example where the hand member 1040 is installed at the robot palm 100 to implement the robotic hand 1000. The robotic hand 1000 is configured so that the object is supported on the upper membrane 30 of the robot palm 100 by bending the finger structure 1046.

FIGS. 3A to 3D are photographs showing that the hand member is installed at the robot palm, where the finger structure is bent so that the object is supported on the upper membrane 30 of the robot palm 100.

Figure 4:
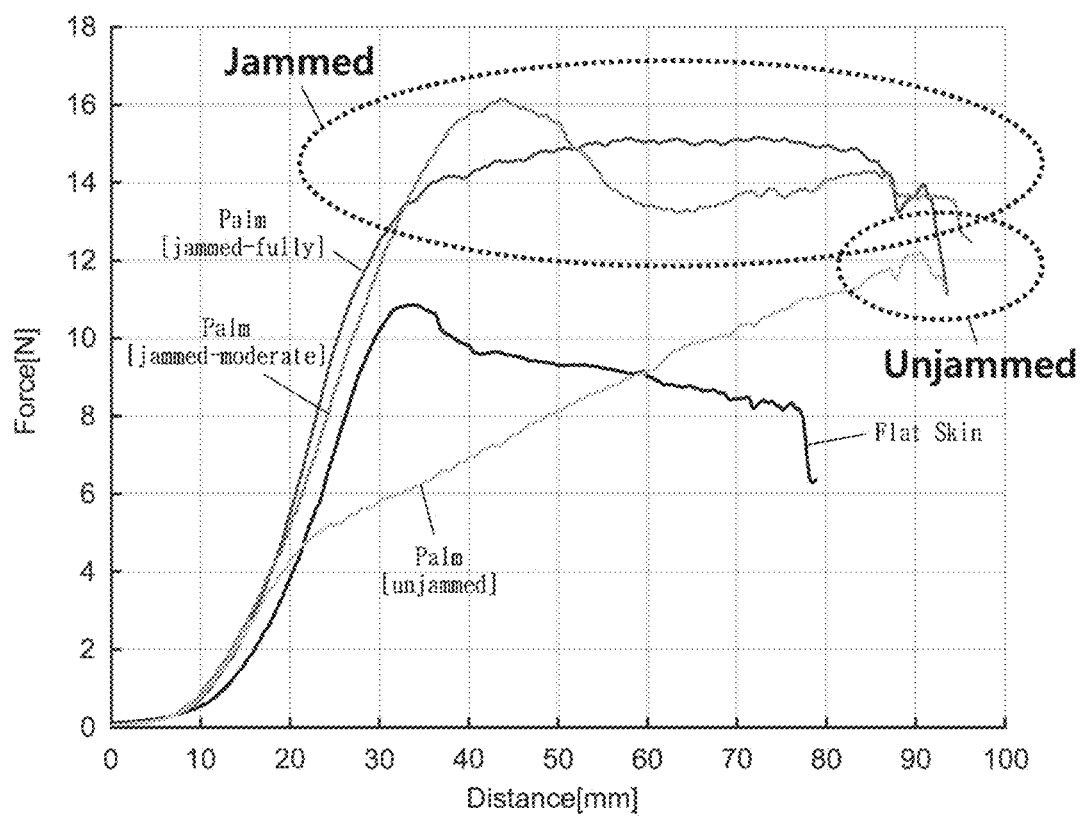
FIG. 4 is a graph showing forces corresponding to each of the following cases in FIGS. 3A to 3D: where the upper membrane is flat (Flat Skin), where the object is not jammed (Palm [unjammed]), where the object is moderately jammed by the robot palm (Palm [jammed-moderate]), and where the object is fully jammed by the robot palm (Palm [jammed-fully]).

In addition, FIG. 4 is a graph showing a force in each of cases where the upper membrane 30 is flat (Flat Skin), where the object is fully jammed by the robot palm 100 (Palm [jammed-fully]), where the object is moderately jammed by the robot palm 100 (Palm [jammed-moderate]), and where the object is not jammed (Palm [unjammed]).

Hereinafter, the robot palm 200 forming a double chamber structure according to the second embodiment of the present disclosure will be described.

Figure 5A:
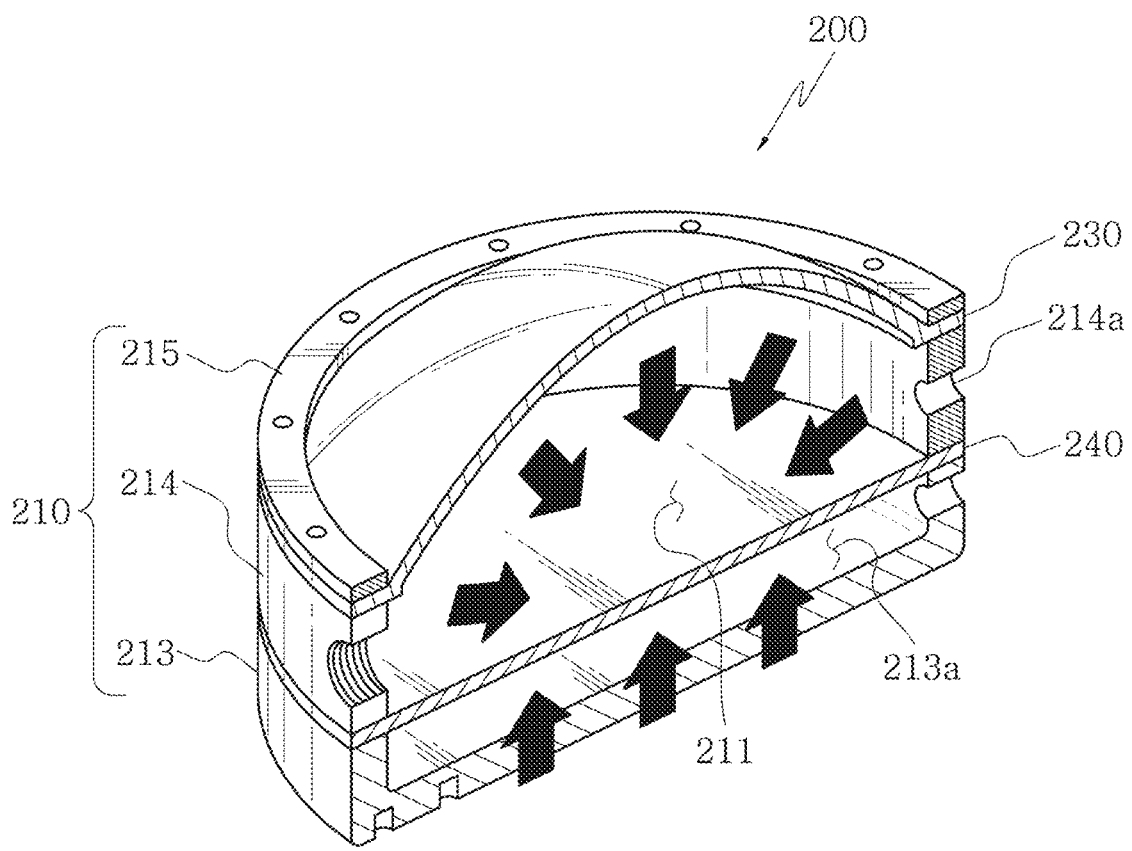
FIG. 5A is a perspective view showing a robot palm according to the second embodiment of the present disclosure.
Figure 5B:
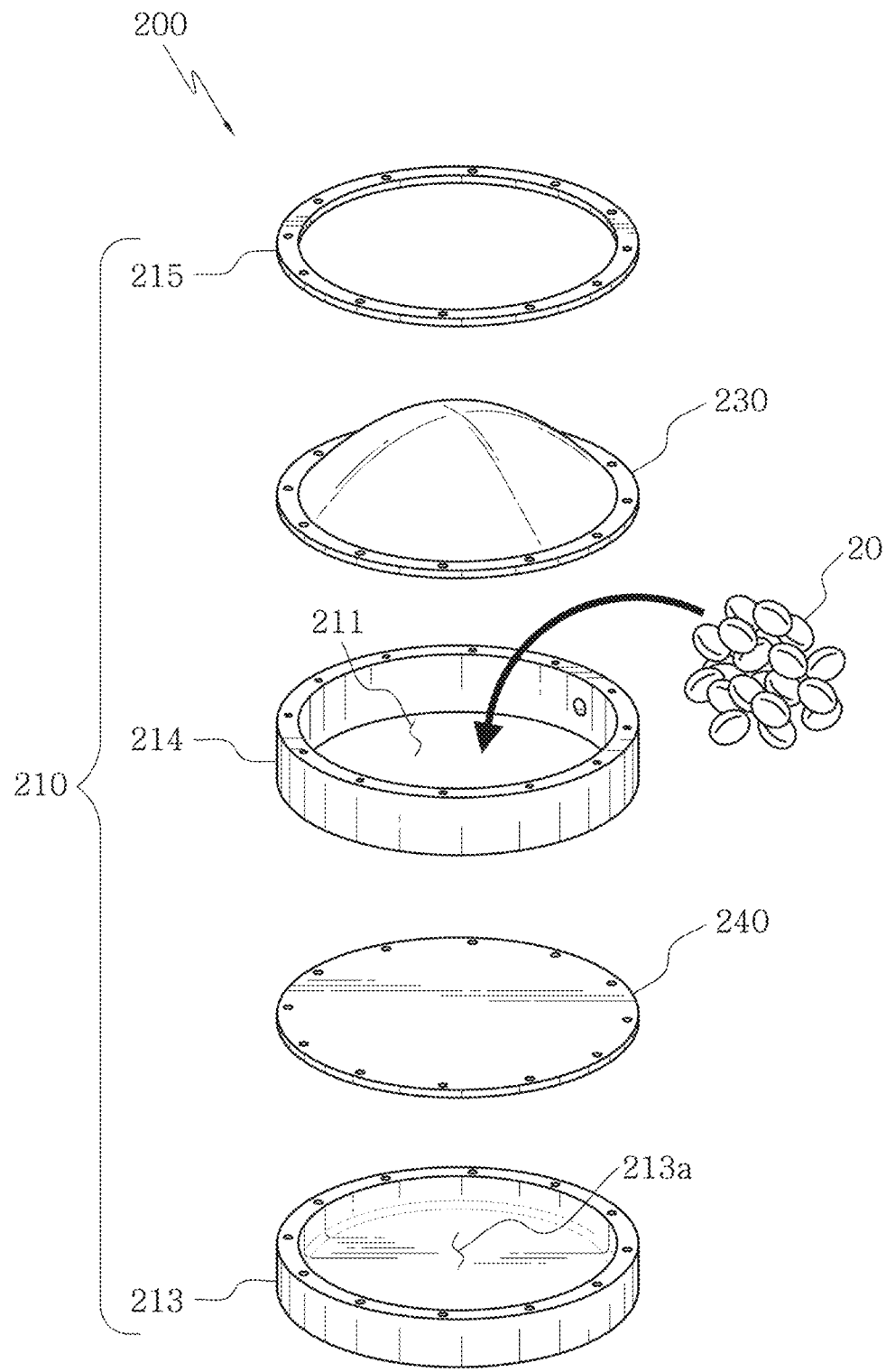
FIG. 5B is an exploded perspective view of FIG. 5A.
Figure 6A:
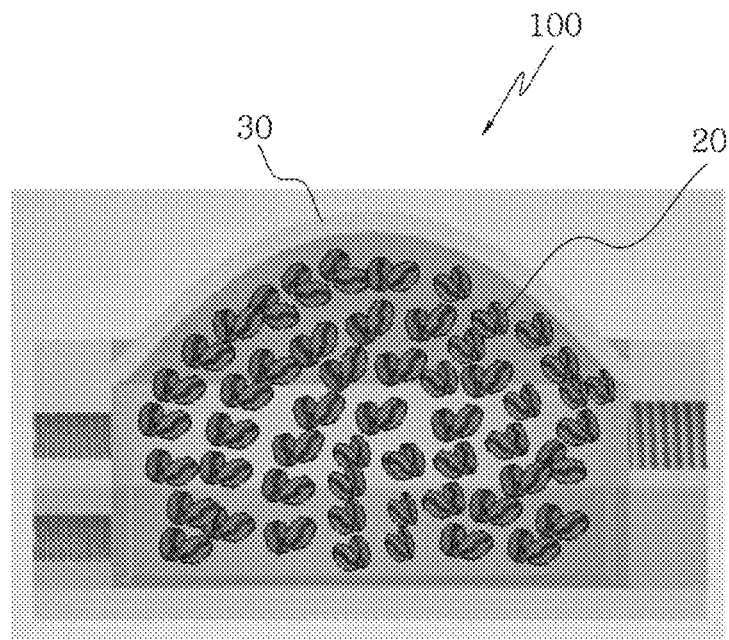
FIG. 6A is a sectional view schematically showing the robot palm according to the first embodiment of the present disclosure.
Figure 6B:
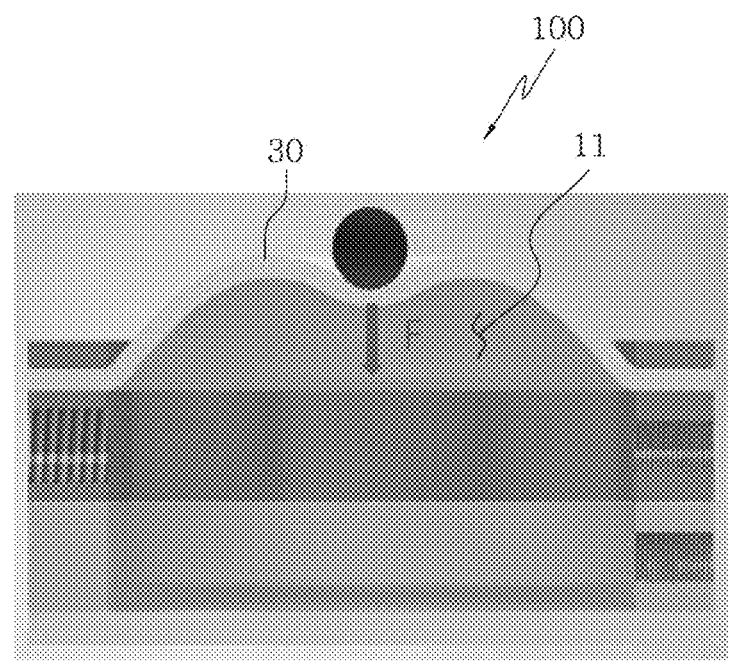
FIG. 6B is a sectional view showing an operation of the robot palm according to the first embodiment of the present disclosure.

In the robot palm 200 of the second embodiment, as shown in FIG. 5A, the housing 210 further includes an air-receiving space 213a capable of accommodating air therein.

In addition, the robot palm 200 further includes a middle membrane 240.

The middle membrane 240 is installed at the housing 210 and is provided between the particle-containing space 211 and the air-receiving space 213a. Air is introduced into the air-receiving space 213a from the outside, and the volume of the air-receiving space 213a may be increased by the introduced air.

The middle membrane 240 provides a pressure upward from the air-receiving space 213a so that the upper membrane 230 in contact with the object is more actively deformed.

The housing 210 may include a base structure 213, a middle structure 214 and a rim 215.

The base structure 213 may include a bottom surface 213c and a sidewall extending upward from the bottom surface 213c.

In addition, the base structure 213 may include an air supply hole 213b. An air supply tube (not shown) may be installed at the air supply hole 213b, and the air supply tube may communicate with the air-receiving space 213a to supply air to the air-receiving space 213a. The air supply tube may be, for example, a tube.

The middle structure 214 may form a side surface between the middle membrane 240 and the upper membrane 230, and the particle-containing space 211 may be provided between the middle membrane 240 and the upper membrane 230.

The middle structure 214 may have a coupling hole 214a. A vacuum tube (not shown) may be connected to the coupling hole 214a of the middle structure 214, and the vacuum tube may communicate with the particle-containing space 211 to provide a negative pressure to the particle-containing space 211, thereby making the particle-containing space 211 vacuous. The vacuum tube may be, for example, a tube.

The rim 215 may be installed at an upper portion of the upper membrane 230 to fix the upper membrane 230 to the middle structure 214.

Figure 7A:
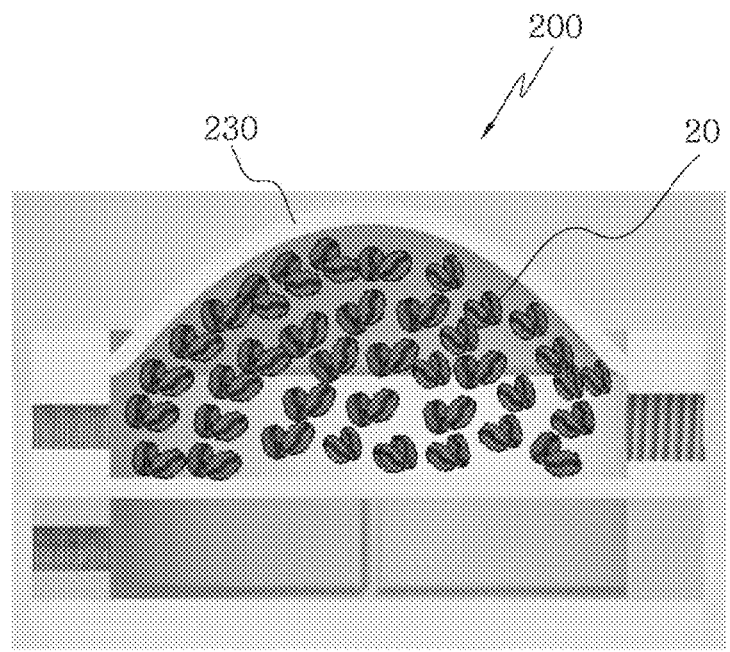
FIG. 7A is a sectional view schematically showing the robot palm according to the second embodiment of the present disclosure.
Figure 7B:
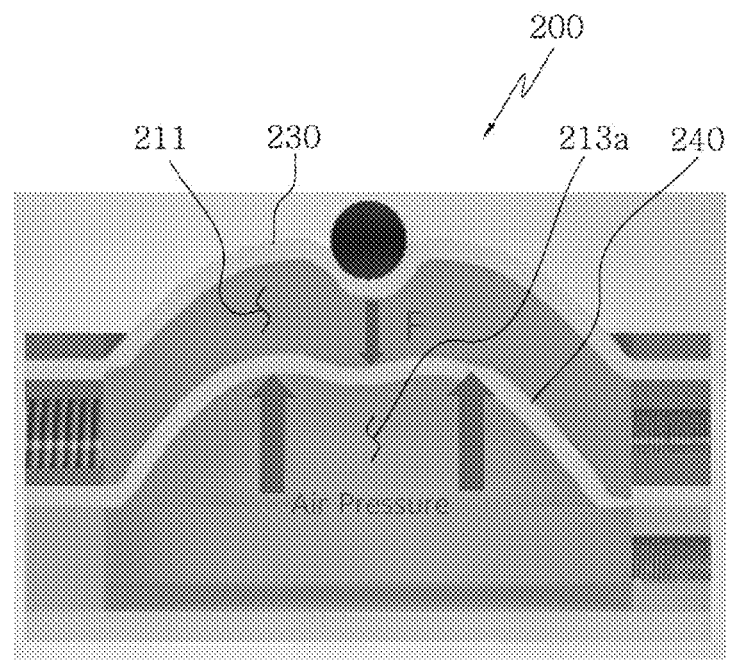
FIG. 7B is a sectional view showing an operation of the robot palm according to the second embodiment of the present disclosure.

Hereinafter, the algorithm by the robot palm 200 according to the second embodiment of the present disclosure will be described with reference to FIGS. 7A to 8.

First, the air-receiving space 213a is inflated to reach an equilibrium state with an air pressure (where the space is no longer expanded).

In this state, if the upper membrane 230 comes into contact with the object, the load of the object is transferred to the particles 20 inside the particle-containing space 211 so that the particles receive the load and press the middle membrane 240, thereby changing the pressure in the air-receiving space 213a. Since the pressure in the equilibrium state is being continuously applied, the pressure changes instantaneously and remains in the equilibrium state again.

For example, different pressure change profiles are formed between an object in quick contact and an object in slow contact. At this time, if a negative pressure is applied to the particle-containing space 211 by detecting a peak point of the profile change, the upper membrane 230 becomes hardened.

In this state, it is not needed to supply the air introduced into the air-receiving space 213a anymore.

In order to separate the object from the upper membrane 230, the negative pressure of the particle-containing space 211 is removed and a positive pressure is provided to the air-receiving space 213a again, whereby the upper membrane 230 returns to its original shape and the object is separated from the upper membrane 230.

The robot palm 200 according to the second embodiment of the present disclosure may improve the adaptability to an object shape, i.e. a volume change, by a double chamber structure further including the air-receiving space 213a in addition to the particle-containing space 211.

The robot palm 200 according to the second embodiment of the present disclosure is not limited in thickness and may be deformed while adapting to the shape of an object and enables to lift the object by itself by changing the shape.

The robot palm 100, 200 as described above is not limited to the configuration and method of the embodiments described above, but the embodiments may be modified in various ways by combining the embodiments entirely or selectively.

It will be apparent to those skilled in the art that the present disclosure can be embodied in other specific forms without departing from the essential characteristics of the present disclosure. Accordingly, the above detailed description should be considered in all respects as examples and not restrictive. The scope of the present disclosure shall be determined by reasonable interpretation of the appended claims, and all changes within the equivalence scope of the present disclosure shall fall within the scope of the present disclosure.

| Reference numerals: |
| --- |
| 100: robot palm |
| 10: housing |
| 11: particle-containing space |
| 13: base structure |
| 13a: bottom surface |
| 13b: sidewall |
| 15: rim |
| 20: particle |
| 30: upper membrane |
| 1000: robotic hand |
| 1040: hand member |
| 1042: palm support |
| 1046: finger structure |
| 1046a: joint portion |
| 1046b: connection pin |
| 200: robot palm |
| 210: housing |
| 211: particle-containing space |
| 213: base structure |
| 213a: air-receiving space |
| 213b: air supply hole |
| 213c: bottom surface |
| 213d: sidewall |
| 214: middle structure |
| 214a: coupling hole |
| 215: rim |
| 20: particle |
| 230: upper membrane |
| 240: middle membrane |

What is claimed is:

1. A robot palm, comprising:
a housing having a particle-containing space configured to accommodate particles and in which a pressure is changeable;
particles filled in the particle-containing space; and
an upper membrane installed at an upper portion of the housing and configured to grip an object by changing a shape and rigidity of the upper membrane according to a pressure change of the particle-containing space;
wherein the housing further includes an air-receiving space configured to accommodate air;
wherein the robot palm further comprises a middle membrane installed at the housing and provided between the particle-containing space and the air-receiving space; and
wherein the housing includes:
a base structure having a bottom surface and a sidewall extending upward from the bottom surface and having the air-receiving space provided at an inside thereof surrounded by the bottom surface and the sidewall;
a middle structure configured to form a side surface between the middle membrane and the upper membrane and having the particle-containing space between the middle membrane and the upper membrane; and
a rim installed at an upper portion of the upper membrane to fix the upper membrane to the middle structure.

2. The robot palm according to claim 1,
wherein a hand member is installed at a lower portion of the housing, which is configured to allow the object to be supported by the upper membrane, and
wherein the hand member includes:
a palm support disposed at the lower portion of the housing to support the housing; and
a finger structure connected to the palm support to be bendable and configured to grip the object.

3. The robot palm according to claim 2,
wherein a plurality of the finger structures are provided, and
wherein each of the finger structures includes:
a plurality of joint portions connected to each other to be bendable relative to each other; and
a connection pin configured to connect neighboring joint portions to each other among the plurality of joint portions.

4. The robot palm according to claim 1,
wherein the air-receiving space is provided to a lower side of the particle-containing space.

5. The robot palm according to claim 1,
wherein an air supply tube is installed at the base structure, which is configured to communicate with the air-receiving space to supply air to the air-receiving space, and
wherein a vacuum tube is connected to the middle structure, which is configured to communicate with the particle-containing space to make the particle-containing space vacuous.

* * * * *